United States Patent
Song

(10) Patent No.: US 9,848,404 B2
(45) Date of Patent: Dec. 19, 2017

(54) METHOD FOR COOPERATING BETWEEN SMART DEVICES AND CLOUD SERVER THEREOF

(71) Applicant: KUMOH NATIONAL INSTITUTE OF TECHNOLOGY INDUSTRY—ACADEMIC COOPERATION FOUNDATION, Gumi (KR)

(72) Inventor: Young Joon Song, Daejeon (KR)

(73) Assignee: KUMOH NATIONAL INSTITUTE OF TECHNOLOGY INDUSTRY-ACADEMIC COOPERATION FOUNDATION, Gumi-si (KR)

( * ) Notice: Subject to any disclaimer, the term of this patent is extended or adjusted under 35 U.S.C. 154(b) by 0 days.

(21) Appl. No.: 15/251,014

(22) Filed: Aug. 30, 2016

(65) Prior Publication Data

US 2017/0251450 A1 Aug. 31, 2017

(30) Foreign Application Priority Data

Feb. 29, 2016 (KR) .................. 10-2016-0024129

(51) Int. Cl.
*H04W 24/00* (2009.01)
*H04W 64/00* (2009.01)
(Continued)

(52) U.S. Cl.
CPC ........... *H04W 64/006* (2013.01); *H04L 67/12* (2013.01); *H04W 84/18* (2013.01)

(58) Field of Classification Search
CPC ...... H04W 64/006; H04W 84/18; H04L 67/12
See application file for complete search history.

(56) References Cited

U.S. PATENT DOCUMENTS

2012/0221639 A1* 8/2012 Mallet ............... G06Q 50/01
709/204
2013/0070044 A1* 3/2013 Naidoo ............... H04N 7/14
348/14.02
(Continued)

FOREIGN PATENT DOCUMENTS

KR 10-2013-0035716 4/2013
KR 10-1317961 10/2013
(Continued)

OTHER PUBLICATIONS

Korean Intellectual Property Office, International Search Report of Application No. PCT/KR2016/009626, dated Nov. 30, 2016.

*Primary Examiner* — Ajit Patel
(74) *Attorney, Agent, or Firm* — Lex IP Meister, PLLC

(57) ABSTRACT

Provided are a method for cooperating between smart devices, which includes: Identifying, by a cloud server, a wireless access device accessed by the first smart device and registering the first smart device as an access group corresponding to the corresponding wireless access device; receiving, by the cloud server, event occurrence information from a second smart device; Determining, by the cloud server, a type of an event, an event occurrence time, and an event occurrence point as the event occurrence information; determining, by the cloud server, a group member associated with the event occurrence time and the event occurrence point among group members of the registered access group as a event group member; Determining, by the cloud server, required information depending on the type of the event and requesting the required information corresponding to the event occurrence time to the event group member; and acquiring and storing, by the cloud server, the required information from the event group member, and a cloud server thereof.

6 Claims, 8 Drawing Sheets

(51) Int. Cl.
*H04L 29/08* (2006.01)
*H04W 84/18* (2009.01)

(56) References Cited

U.S. PATENT DOCUMENTS

| | | | |
|---|---|---|---|
| 2014/0066028 A1 | 3/2014 | Miller | |
| 2014/0293993 A1* | 10/2014 | Ryhorchuk | H04W 4/006 370/350 |
| 2014/0359101 A1* | 12/2014 | Dawes | H04L 41/18 709/223 |
| 2015/0141005 A1* | 5/2015 | Suryavanshi | H04L 67/125 455/434 |
| 2015/0147997 A1* | 5/2015 | Shaw | G06F 21/554 455/404.2 |
| 2017/0012812 A1* | 1/2017 | Gotoh | H04W 4/027 |
| 2017/0191842 A1* | 7/2017 | Magazinik | G01C 21/3438 |

FOREIGN PATENT DOCUMENTS

| | | |
|---|---|---|
| KR | 10-2014-0086212 | 7/2014 |
| KR | 10-1585379 | 1/2016 |

\* cited by examiner

METHOD FOR COOPERATING BETWEEN SMART DEVICES AND CLOUD SERVER THEREOF

CROSS-REFERENCE TO RELATED APPLICATION

This application claims priority to and the benefit of Korean Patent Application No. 10-2016-0024129 filed in the Korean Intellectual Property Office on Feb. 29, 2016, the entire contents of which are incorporated herein by reference.

BACKGROUND OF THE INVENTION (a) Field of the Invention

The present invention relates to a method for cooperating between smart devices and a cloud server thereof.

(b) Description of the Related Art

With the development of network technology, communication technology, and terminal technology, technology has been generalized, which allows a server or an apparatus at a remote destination to collect information determined by a sensor or a terminal.

In the case of the information collection in the related art, the information provided by each sensor or terminal is collected by using a sensor network or picked-up images are collected from a CCTV, and the like in most cases. However, in the case of the information collection in the related art, information provided by the sensor or terminal at a fixed location is collected or information provided by a user who agrees to request the information collection is collected.

Therefore, in the information collecting method in the related art, only fractional information in which the sensor or terminal provides information at event and accident scenes is collected and it is difficult to collect stereoscopic information provided in various directions. Further, the information cannot be collected in a situation in which the terminal such as the sensor or the CCTV is not installed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for cooperating between smart devices and a cloud server thereof which can stereoscopically acquire information on an event at a specific point from a smart device having mobility.

An exemplary embodiment may be used to achieve other problems which have not been specifically mentioned in addition to the problem.

In order to solve the problem, an exemplary embodiment of the present invention provides a method for cooperating between smart devices.

The method includes: identifying, by a cloud server, a wireless access device accessed by a first smart device accessed by the cloud server and registering the first smart device as an access group corresponding to the corresponding wireless access device; receiving, by the cloud server, event occurrence information from a second smart device; determining, by the cloud server, a type of an event, an event occurrence time, and an event occurrence point as the event occurrence information; determining, by the cloud server, a group member associated with the event occurrence time and the event occurrence point among group members of the registered access group as an event group member; determining, by the cloud server, required information depending on the type of event and requesting the required information corresponding to the event occurrence time to the event group member; and acquiring and storing, by the cloud server, the required information from the event group member.

The wireless access device may be an access point of a local area communication network or a base station of a mobile communication network.

In the determining of the event group member, a group member of a group to which the first smart device providing the event occurrence information at the event occurrence time belongs may be determined as the event group member, a smart device positioned within a set radius based on the event occurrence point at the event occurrence time may be determined as the event group member, or group members of respective access groups corresponding to all wireless access devices having a part of a set radius based on the event occurrence point at the event occurrence time as an access area may be determined as the event group members.

The method may further include when information on an escape direction of an assailant is included in the event occurrence information, determining the event group member and acquiring the required information from the event group member, and thereafter, determining the group member of the access group positioned in the escape direction as the event group member and requesting and acquiring the required information.

In order to solve the problem, another exemplary embodiment of the present invention provides a cloud server. The cloud server includes: a communication unit serving to communicate with a smart device; an accessor verifying unit identifying the smart device accessed through the communication unit and identifying a wireless access device which the corresponding smart device accesses; a group member managing unit registering the smart device as a group member of an access group corresponding to the corresponding wireless access device based on the wireless access device which accesses the smart device; a group storing unit storing information on each access group and the group member of each access group; an event receiving unit receiving event occurrence information from a first smart device and determining a type of an event, an event occurrence point, and an event occurrence time through the event occurrence information; an event group member determining unit having basic information of the wireless access device including information on an installation location of each wireless access device and an access area of each wireless access device and determining the event group member based on a point where and a time when the event occurs by using the basic information of the wireless access device and the information stored in the group storing unit; and an information acquiring unit determining required information depending on the type of the event and requesting the required information corresponding to the event occurrence time to the event group member.

The event group member determining units may determine a group member of a group to which the first smart device providing the event occurrence information at the event occurrence time belongs as the event group member, determine a smart device positioned within a set radius based on the event occurrence point at the event occurrence time as the event group member, or determine respective access groups corresponding to all wireless access devices having a part of a set radius based on the event occurrence point at the event occurrence time as an access area as the event group member.

When information on an escape direction of an assailant is included in the event occurrence information, the event group member determining unit may determine the event group member and acquires the required information from the event group member, and thereafter, determine the group member of the access group positioned in the escape direction as the event group member and request and acquire the required information.

According to an exemplary embodiment of the present invention, smart devices are registered as a group according to connection locations and thereafter, information on an event occurrence time is acquired from an event group member by determining the event group member according to an event occurrence location and the event occurrence time (an occurrence time), thereby stereoscopically determining a situation of an event.

DETAILED DESCRIPTION OF THE EMBODIMENTS

Figure 1:
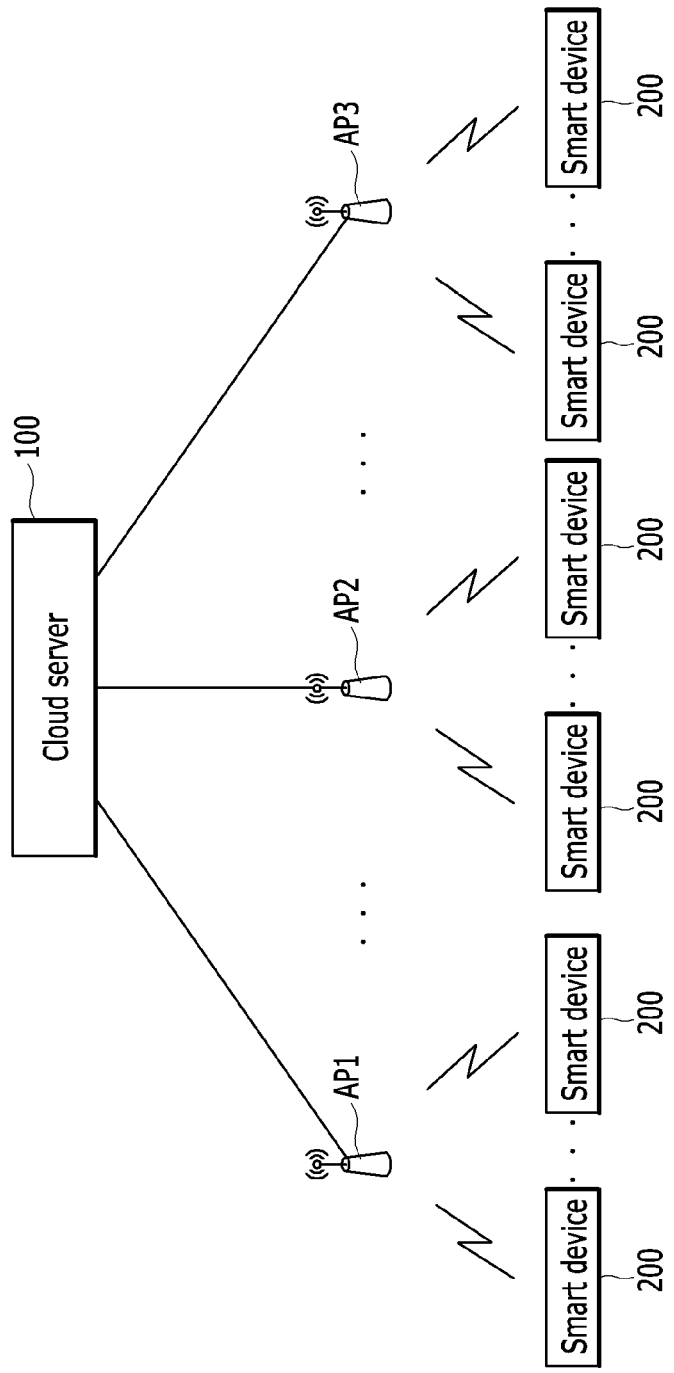
FIG. 1 is a network configuration diagram of a system for cooperating between smart devices according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In the drawings, parts not associated with description are omitted for clearly describing the exemplary embodiment of the present invention and like reference numerals designate like elements throughout the specification. Further, detailed description of known art which is widely known will be omitted.

In the present specification, unless explicitly described to the contrary, the word "comprise" and variations such as "comprises" or "comprising", will be understood to imply the inclusion of stated elements but not the exclusion of any other elements. In addition, terms including "unit", "module", and the like disclosed in the specification mean a unit that processes at least one function or operation and this may be implemented by hardware or software or a combination of hardware and software.

Hereinafter, a method for cooperating between smart devices and a cloud server thereof according to exemplary embodiments of the present invention will be described with reference to the accompanying drawings.

FIG. 1 is a network configuration diagram of a system for cooperating between smart devices according to an exemplary embodiment of the present invention. As illustrated in FIG. 1, the system for cooperating between smart devices according to the exemplary embodiment of the present invention includes a cloud server 100, a plurality of wireless access devices AP1, AP2, AP3, and the like forming a network, and a plurality of smart devices 200.

When the cloud server 100 is positioned on the Internet and classifies the respective smart devices 200 into respective access groups according to current locations of the corresponding smart devices 200 and receives event occurrence from at least one smart device, the cloud server 100 determines an event group based on the access group and collects information corresponding to the corresponding event from each smart device 200 which is a group member (that is, an event group member) of the event group.

Herein, a type of event includes various events, accidents, and the like which may occur in an unspecific region, such as a terror, a crime, fire, a traffic accident, and the like. The cloud server 100 may have a function to autonomously analyze the collected information or request analysis to an external device connected to a network. Further, the cloud server 100 is connected with a police station, a fire station, or other public offices through the network to share the collected or analyzed information or announce a risk situation.

The plurality of wireless access devices AP1, AP2, AP3, and the like are devices that allow the smart device 200 to wirelessly access the network, such as an access point of a WiFi network or a base station of a mobile communication network. The plurality of smart devices 200 are communication devices which are portable and data-communicatable by accessing the network through one wireless access device, such as a cellular phone, a notebook, a netbook, and the like.

Figure 2:
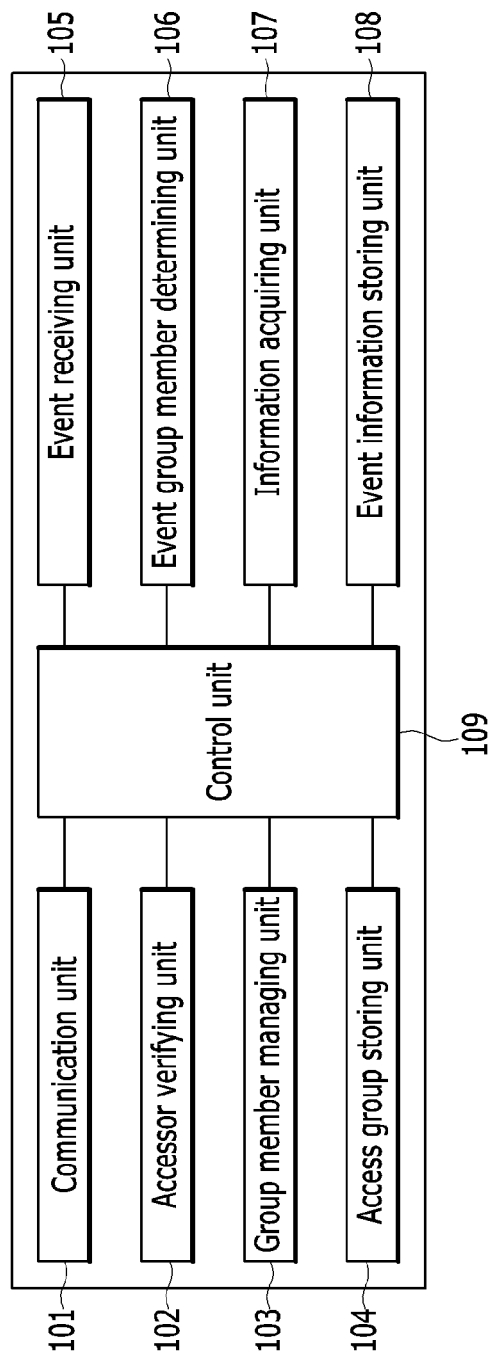
FIG. 2 is a block diagram of a cloud server according to an exemplary embodiment of the present invention.

FIG. 2 is a block diagram of a cloud server according to an exemplary embodiment of the present invention. Referring to FIG. 2, the cloud server 100 according to the exemplary embodiment of the present invention includes a communication unit 101, an accessor verifying unit 102, a group member managing unit 103, an access group storing unit 104, an event receiving unit 105, an event group member determining unit 106, an information acquiring unit 107, an event information storing unit 108, and a control unit 109.

Further, the cloud server 100 may further include a member registering unit (not illustrated) for member registration and when the cloud server 100 performs communication with a mobile device by using a mobile application (APP), the cloud server 100 may further include a storage unit (not illustrated) storing the mobile APP and a downloading unit (not illustrated) downloading the mobile APP.

The communication unit 101 serves to communicate with the smart device 200. The accessor verifying unit 102 identifies an accessor (the smart device 200 or a user of the smart device) accessed through the communication unit 101 and identifies the wireless access device which the corresponding smart device 200 accesses.

The group member managing unit 103 registers the accessor in one access group as the group member based on the wireless access device which the accessor accesses. The group member managing unit 103 receives and registers identification information, current positional information, and the like of the smart device from the accessor at the time of registering the group member. Therefore, the accessor moves to a new access group from a previous access group or is initially registered in the access group. For example, the group member managing unit 103 verifies whether the accessor is registered as the access group by using the information identified by the accessor verifying unit 102, registers the accessor as the group member of the access group corresponding to the accessing wireless access device when the accessor is not registered as the access group, and determines whether the identification information of the wireless access device of the registered access group, which is registered and the identification information of the currently accessing wireless access device are identical to each other, and thereafter, registers the accessor in a new access group when both identification information is not identical to each other when the accessor is registered as the access group. Herein, the group member managing unit 103 may allow the accessor to be registered in the access group only when the accessor is a member.

The access group storing unit 104 stores information on each access group and the group member of each access group and in this case, the stored information is managed by the group member managing unit 103. The event receiving unit 105 receives an event occurrence message (event occurrence information) received through the communication unit 101 and determines the type of event, the event occurrence point, and the event occurrence time through the event occurrence information.

The event group member determining unit 106 has basic information of the wireless access device for installation locations of the respective wireless access devices AP1, AP2, AP3, and the like and access areas Z1, Z2, Z3, and the like of the respective wireless access devices and determines the event group member based on the point where and the time when the event occurs by using the basic information of the wireless access device and the information stored in the group storing unit 104.

Herein, the point (that is, the event occurrence point) where the event occurs is information (e.g., coordinate information, point of interest (POI), a place name, and the like) on a current location of the smart device 200 which announces the event occurrence or the event occurrence location provided by the smart device 200 which announces the event occurrence. In addition, the event group member may be a group member of the access group to which the point where the event occurs belongs (see FIG. 3), a group member positioned within a set radius R from the point where the event occurs (see FIG. 4), or group members (see FIG. 5) of all access groups including at least a part of an area formed by the set radius R from the point where the event occurs.

The information acquiring unit 107 receives the identification information (a phone number or an MAC address) of each event group member from the event group member determining unit 106 and receives the type of event from the event receiving unit 105. In addition, the information acquiring unit 107 determines required information (information which needs to be acquired from the smart device) depending on the type of event, requests required information depending on the event occurrence time and the type of occurring event to each event group member, and acquires required information corresponding to the event occurrence time from each event group member and stores the acquired required information in the event information storing unit 108 according to the information request.

The event information storing unit 108 stores the information for each event received from the information acquiring unit 107 in response to identification information of an information provider (that is, each smart device) and event identification information.

The control unit 109 controls overall operations of the components 101 to 108 to receive the event and acquire and store information corresponding to the received event.

Hereinafter, a method for configuring a group and configuring an event group member will be described with reference to FIGS. 3 to 5.

Figure 3:
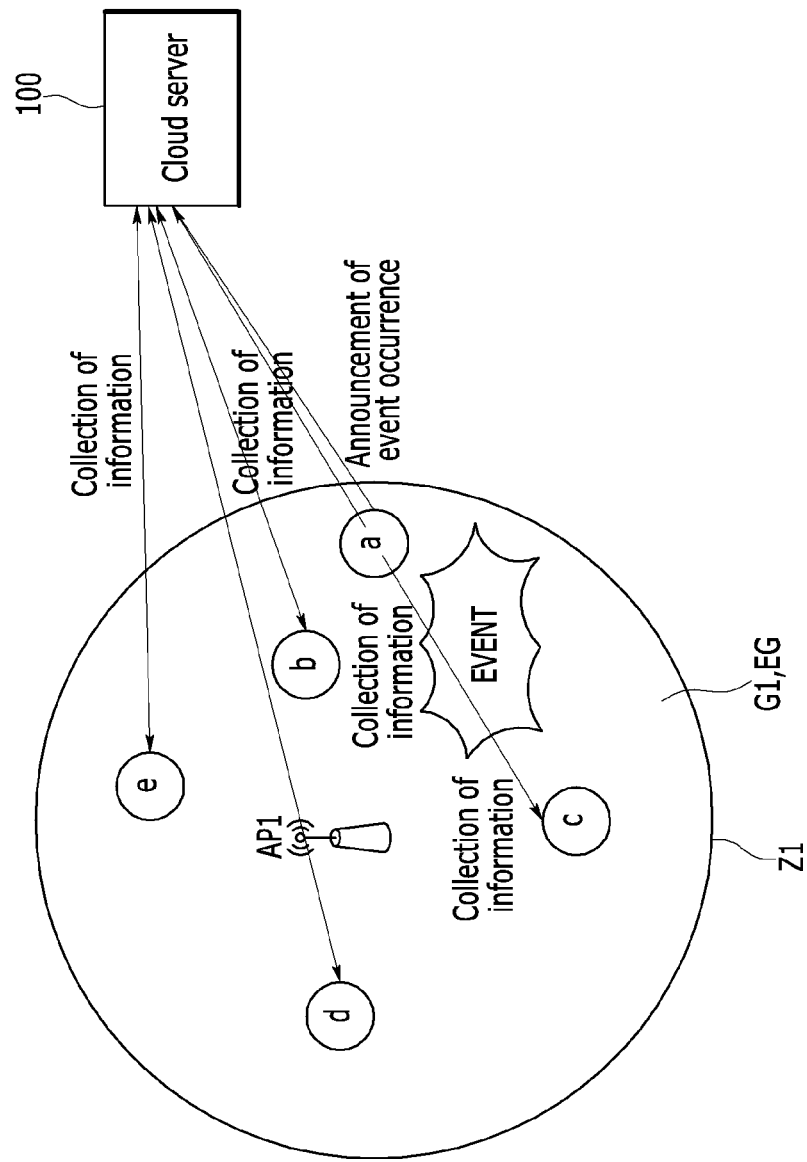
FIG. 3 is a diagram illustrating a method for configuring a connection group and an event group according to an exemplary embodiment of the present invention.

FIG. 3 which is a diagram illustrating a method for configuring an event group member according to an exemplary embodiment of the present invention illustrates a first wireless access device AP1 among a plurality of wireless access devices as one example.

Referring to FIG. 3, smart devices a to e positioned in an access area of the first wireless access device A1 access the cloud server 100 through the first wireless access device A1 and the cloud server 100 registers each of the smart devices a to e as the group member of an access group (hereinafter, referred to as "first access group G1") of the first wireless access device A1.

In such a state, when one group member (mobile a in FIG. 3) of the first access group G1 provides the event occurrence information including the type of event, the event occurrence point (location), and the event occurrence time to the cloud server 100, the cloud server 100 determines the type of event included in the event occurrence information, determines a type of collected information configured in response to the type of event, identifies the first wireless access device AP1 which one group member accesses and registers the first access group G1 in the event group EG, and determines all group members of the first access group G1 as the event group member EG of the corresponding event.

Then, the cloud server 100 determines access information (the phone number, the MAC address, a messenger ID, an e-mail ID, and the like) of each event group member and requests and acquires the collected information through the access information.

Figure 4:
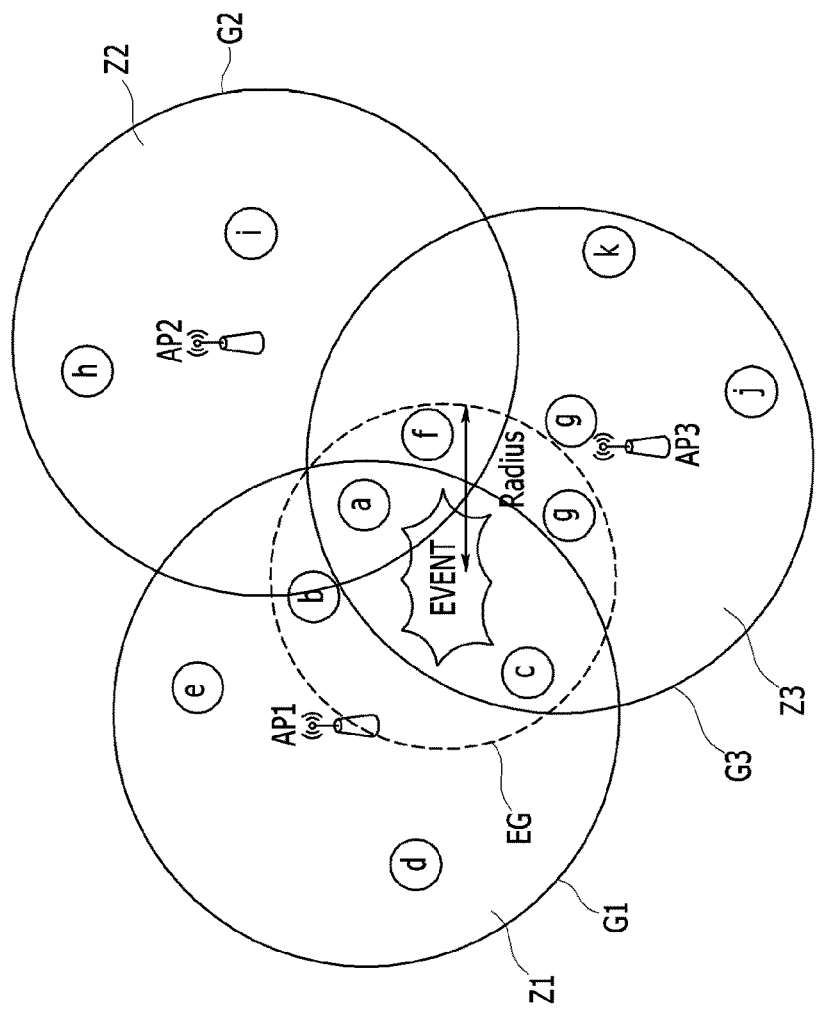
FIG. 4 is a diagram illustrating a method for configuring a connection group and an event group according to another exemplary embodiment of the present invention.

FIG. 4 which is a diagram illustrating a method for configuring an access group and an event group according to another exemplary embodiment of the present invention illustrates first to third wireless access devices AP1 to AP3 among a plurality of wireless access devices as one example.

Referring to FIG. 4, the cloud server 100 registers the accessor which is accessed through the first wireless access device A1 as the group member of the first access group G1, registers the accessor which is accessed through a second wireless access device A2 as the group member of a second access group G2, and registers the accessor which is accessed through a third wireless access device A3 as the group member of a third access group G3.

In such a state, when the event occurrence information including the type of event, the event occurrence location, and the event occurrence time is provided from one smart device 200 to the cloud server 100, the cloud server 100 determines the type of event included in the event occurrence information and the type of the collected information configured in response to the type of event.

In addition, the cloud server 100 determines the event occurrence point and determines the group member of each group positioned within the set radius R based on the event occurrence point as the group member of the event group EG. In this case, the event group member is determined by using the current positional information of each smart device 200 registered at the time of registering the access group member.

Then, the cloud server 100 determines the access information (the phone number, the MAC address, the messenger ID, the e-mail ID, and the like) of each event group member and requests and acquires the collected information through the access information.

Figure 5:
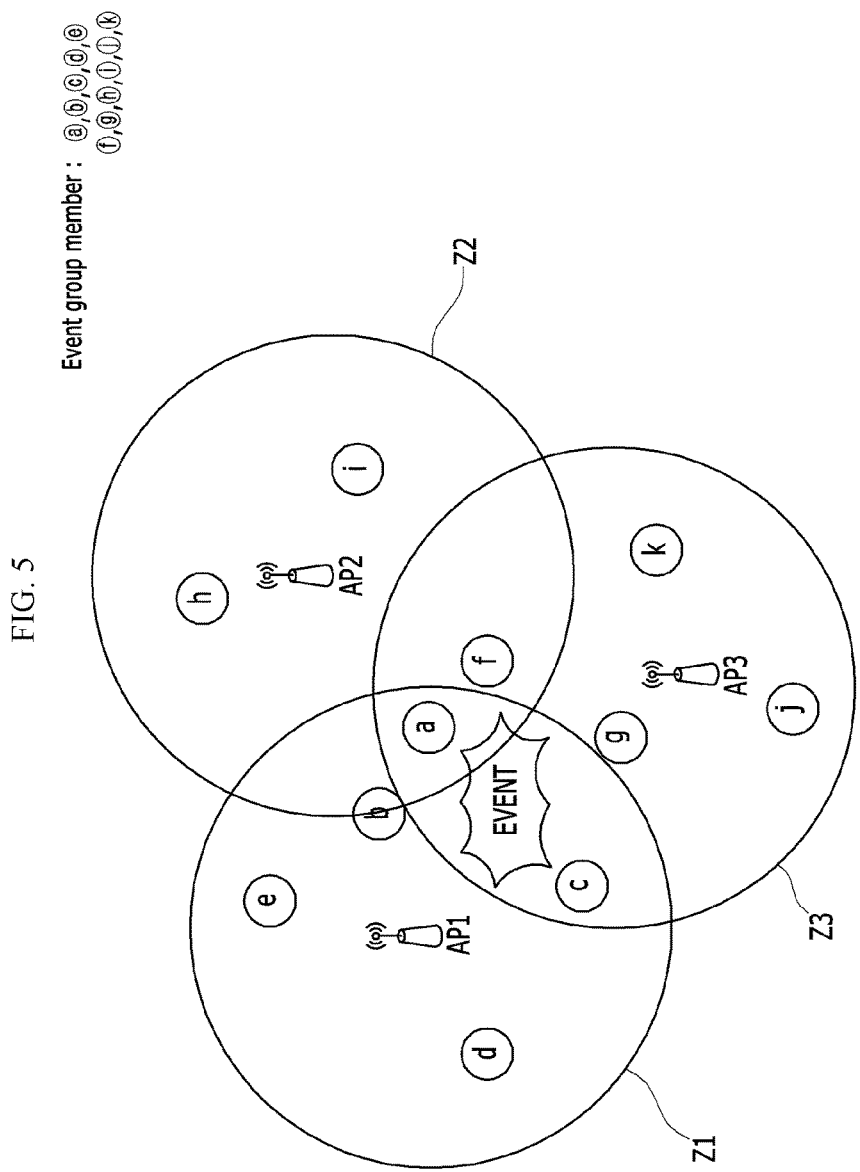
FIG. 5 is a diagram illustrating a method for configuring a connection group and an event group according to yet another exemplary embodiment of the present invention.

FIG. 5 which is a diagram illustrating a method for configuring an access group and an event group according to yet another exemplary embodiment of the present invention illustrates first to third wireless access devices AP1 to AP3 among a plurality of wireless access devices as one example.

Referring to FIG. 5, the cloud server 100 registers the accessor which is accessed through the first wireless access device A1 as the group member of the first access group G1, registers the accessor which is accessed through the second wireless access device A2 as the group member of the second access group G2, and registers the accessor which is accessed through the third wireless access device A3 as the group member of the third access group G3.

In such a state, when the event occurrence information including the type of event, the event occurrence location, and the event occurrence time is provided from one smart device 200 to the cloud server 100, the cloud server 100 determines the type of event included in the event occurrence information and the type of collected information configured in response to the type of event.

In addition, the cloud server 100 determines the event occurrence point, determines an event area in the set radius R based on the event occurrence point, determines the access group including at least a part of the event area, configures the determined access group as the event group EG, and determines all group members of the event group EG as the event group members.

Then, the cloud server 100 determines the access information (the phone number, the MAC address, the messenger ID, the e-mail ID, and the like) of each event group member and requests and acquires the collected information through the access information.

Hereinafter, a method for cooperating between smart devices according to an exemplary embodiment of the present invention will be described.

Figure 6:
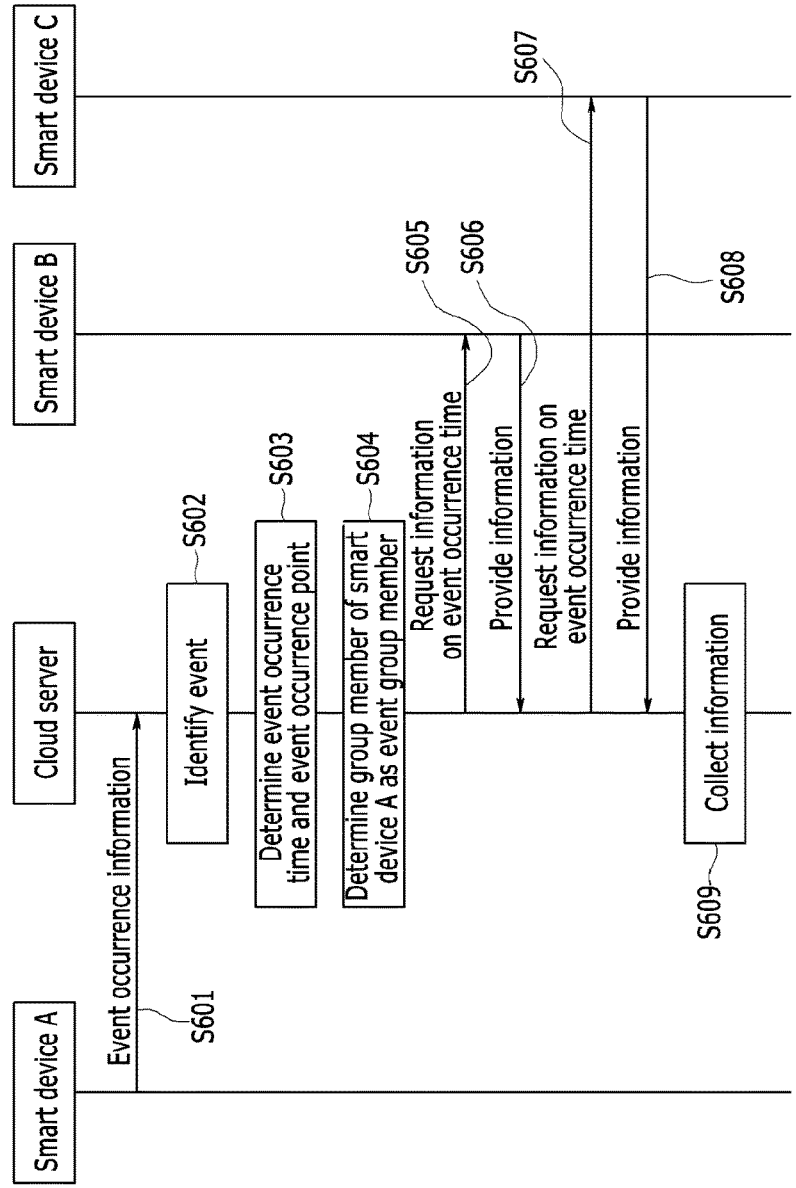
FIG. 6 is a flowchart illustrating a method for cooperating between smart devices according to an exemplary embodiment of the present invention.

FIG. 6 which is a flowchart illustrating a method for cooperating between smart devices according to an exemplary embodiment of the present invention relates to a case in which the access group of the wireless access device of the smart device which announces event occurrence is configured as the event group. In the following description, a group member registering process will be omitted.

Referring to FIG. 6, when the control unit 109 of the cloud server 100 receives the event occurrence information from a smart device A through the communication unit 101 (S601), the control unit 109 identifies the type of event by the event occurrence information through the event receiving unit 105 (S602) and determines the event occurrence time and the event occurrence point (S603). Herein, the event occurrence point is the identification information of the wireless access device or positional information when the event group member is determined by using the set radius from the event occurrence point as described with reference to FIGS. 4 and 5.

When the control unit 109 determines that the event occurrence point is within the access area of the first wireless access device AP1 through the identification information of the wireless access device as the event occurrence point, the control unit 109 determines the group member of the access group G1 of the first wireless access device AP1 at the event occurrence time as the event group member through the event group member determining unit 106 (S604).

In addition, the control unit 109 requests (S605 and S607) information on the corresponding event to each event group member through the information acquiring unit 107 and acquires (S606 and S608) the information on the corresponding event. Further, the control unit 109 stores the information acquired by the information acquiring unit 107 in the event information storing unit 180 (S609).

Figure 7:
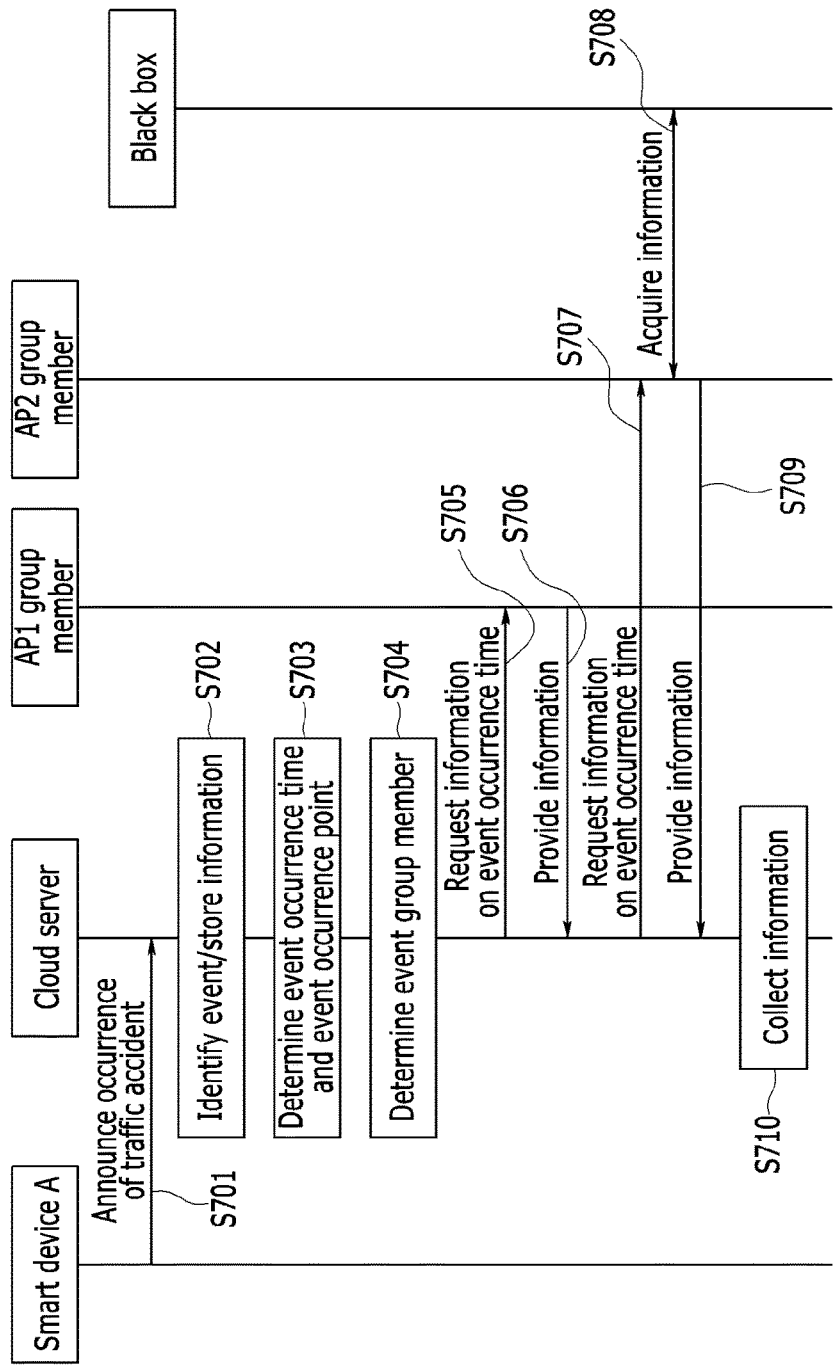
FIG. 7 is a flowchart illustrating a method for cooperating between smart devices according to another exemplary embodiment of the present invention.

FIG. 7 which is a flowchart illustrating a method for cooperating between smart devices according to another exemplary embodiment of the present invention relates to a case in which the event group member is determined by using the set radius from the event occurrence point and a case in which the event is the traffic accident. In the following description, the group member registering process will be omitted.

Referring to FIG. 7, the smart device A transmits traffic accident announcement information announcing the traffic accident to the cloud server 100 (S701), the accessor verifying unit 102 of the cloud server 100 verifies the accessor through the identification information of the smart device A included in the traffic accident announcement information received through the communication unit 101, the group member managing unit 103 determines the group to which the smart device A belongs through the identification information of the wireless access device included in the traffic accident announcement information, and the event receiving unit 105 receives the event and the determines the type of event through the event identification information included in the event occurrence information (S702).

In addition, a traffic accident event is identified by announcement of occurrence of the traffic accident through the event receiving unit 105 (S602) and a traffic accident occurrence time and a traffic accident occurrence point are determined (S703).

When the control unit 109 determines the event occurrence point as the current location of the smart device A, the control unit 109 determines the event group member by using the current location of the smart device A and the event occurrence point (S704). In this case, the event group member is smart devices positioned within the set radius R based on the current location of the smart device A at the event occurrence time or all group members of the access group including at least a part of the event area within the set radius R based on the current location of the smart device A at the event occurrence time.

When the event group member is determined, the control unit 109 requests information on an occurrence time of the traffic accident to each event group member through the information acquiring unit 107 (S705 and S707) and acquires the information on the occurrence time of the traffic accident (S706 and S708). In addition, the control unit 109 stores the information acquired by the information acquiring unit 107 in the event information storing unit 180 (S710).

Herein, the information provided by the event group member is a pick-up information (a photograph or a moving picture), voice information, or information (a text or a figure) on the accident, which is directly input by the group member, which is information at the occurrence time of the traffic accident or within a set time based on the occurrence time of the traffic accident. The information provided by the event group member may be information picked up or recorded directly by the smart device or which the user prepares through the mobile device or information acquired through communication between the smart device and another electronic device (e.g., a navigation, a black box, and the like).

Figure 8:
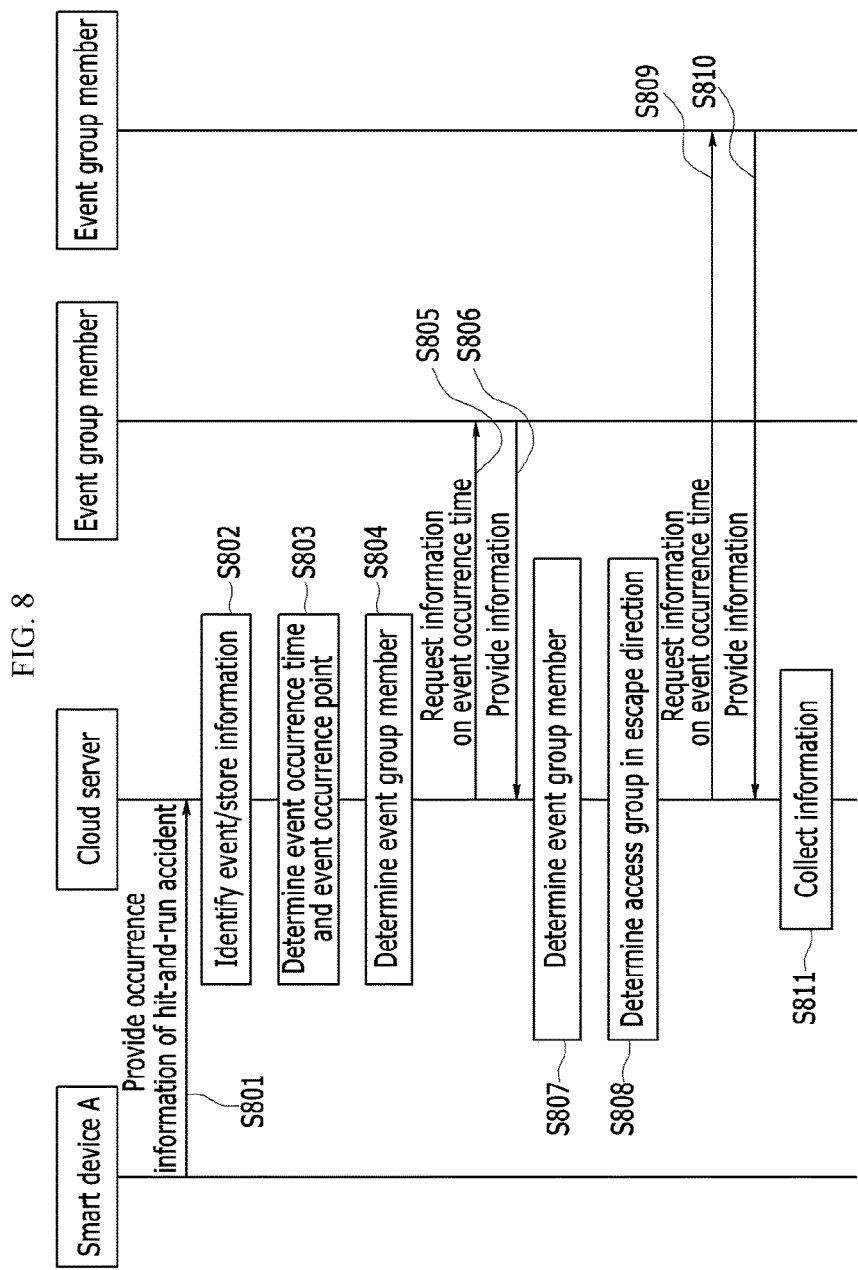
FIG. 8 is an exemplary diagram illustrating a method for cooperating between smart devices according to an exemplary embodiment of the present invention.

FIG. 8 which is an exemplary diagram illustrating a method for cooperating between smart devices according to an exemplary embodiment of the present invention relates to a case in which information on an event is acquired when the event occurs or when an assailant moves.

The smart device A transmits the event occurrence information for announcing occurrence of a hit-and-run accident, a robbery accident, a kidnap accident, or the like to the cloud server 100 (S801). In this case, the user of the smart device A makes information for announcing the type of the event and a movement direction (that is, the escape direction) of the assailant be included in the event occurrence information.

The accessor verifying unit 102 of the cloud server 100 verifies the accessor through the identification information of the smart device A included in the traffic accident announcement information received through the communication unit 101, the group member managing unit 103 determines the group to which the smart device A belongs through the identification information of the wireless access device included in the traffic accident announcement information, and the event receiving unit 105 receives the event and the determines the type of the event through the event identification information included in the event occurrence information (S802).

In addition, the control unit 109 identifies a traffic accident event by announcing the occurrence of the traffic accident through the event receiving unit 105 (S602) and determines a hit-and-run occurrence point and a hit-and-run occurrence time as information on the current location of the smart device or an accident occurrence point provided by the smart device A (S803).

The event group member determining unit 106 determines the event group member through the hit-and-run occurrence point and the hit-and-run occurrence time (S804), and as a result, the information acquiring unit 107 requests information to each event group member (S805) and acquires the information (S806).

In addition, the event group member determining unit 106 determines the escape direction (S807), determines the access group positioned in the escape direction from the event location (S808), requests information to the group member of the determined access group (S809), and acquires the information (S810). Herein, one or more access groups are positioned in the escape direction and the access group which first requests the information is preferably the access group in the escape direction, which is close to the event occurrence point and the access group which does not belong to the event group member. The control unit 109 stores the information acquired by the information acquiring unit 107 in the event information storing unit 180 (S811).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

100: Cloud server
101: Communication unit
103: Group member managing unit
105: Event receiving unit
106: Event group member determining unit
200: Smart device
102: Accessor verifying unit
104: Access group storing unit <Description of symbols>

107: Information acquiring unit
108: Event information storing unit
109: Control unit

What is claimed is:

1. A method for cooperating between smart devices, the method comprising:
   identifying, by a cloud server, a wireless access device accessed by a first smart device, wherein the first smart device is accessed by the cloud server, and registering the first smart device as a registered access group corresponding to the wireless access device, wherein the registered access group includes a plurality of group members;
   receiving, by the cloud server, event occurrence information from a second smart device;
   determining, by the cloud server, a type of an event, an event occurrence time, and an event occurrence point as the event occurrence information;
   determining, by the cloud server, a group member associated with the event occurrence time and the event occurrence point among the group members of the registered access group as an event group member;
   determining, by the cloud server, required information depending on the type of event and requesting the required information corresponding to the event occurrence time to the event group member; and
   acquiring and storing, by the cloud server, the required information from the event group member.

2. The method of claim 1, wherein:
   the wireless access device is an access point of a local area communication network or a base station of a mobile communication network.

3. The method of claim 1, wherein:
   in the determining of the event group member,
   a group member of a group to which the first smart device providing the event occurrence information at the event occurrence time belongs is determined as the event group member.

4. The method of claim 1, wherein:
   in the determining of the event group member,
   a smart device positioned within a set radius based on the event occurrence point at the event occurrence time is determined as the event group member.

5. The method of claim 1, wherein:
   in the determining of the event group member,
   group members of respective access groups corresponding to all wireless access devices having a part of a set radius based on the event occurrence point at the event occurrence time as an access area are determined as the event group members.

6. The method of claim 3, wherein:
   when information on an escape direction of an assailant is included in the event occurrence information,
   determining the event group member and acquiring the required information from the event group member, and thereafter,
   determining the group member of the access group positioned in the escape direction as the event group member and requesting and acquiring the required information.

* * * * *